Figure 1:
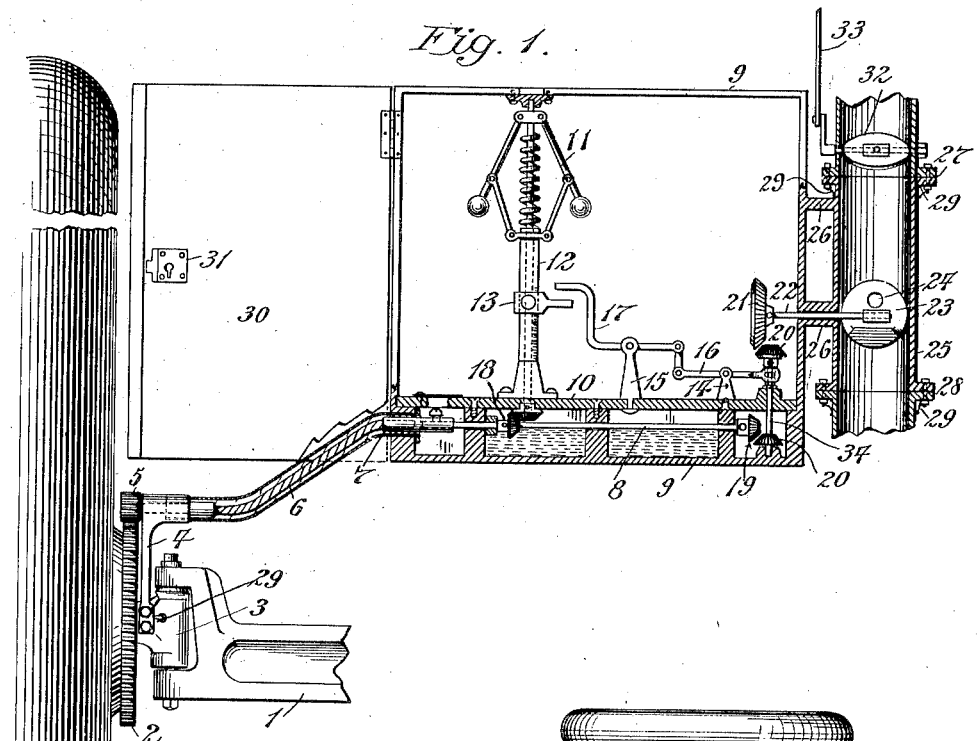

B. F. LORD, Jr.
SPEED CONTROLLER FOR MOTOR VEHICLES.
APPLICATION FILED FEB. 17, 1910.

1,009,675.

Patented Nov. 21, 1911.

2 SHEETS—SHEET 1.

Witnesses
Wm. Tallaway.
Robert Dawsend

Inventor
Benjamin F. Lord Jr.

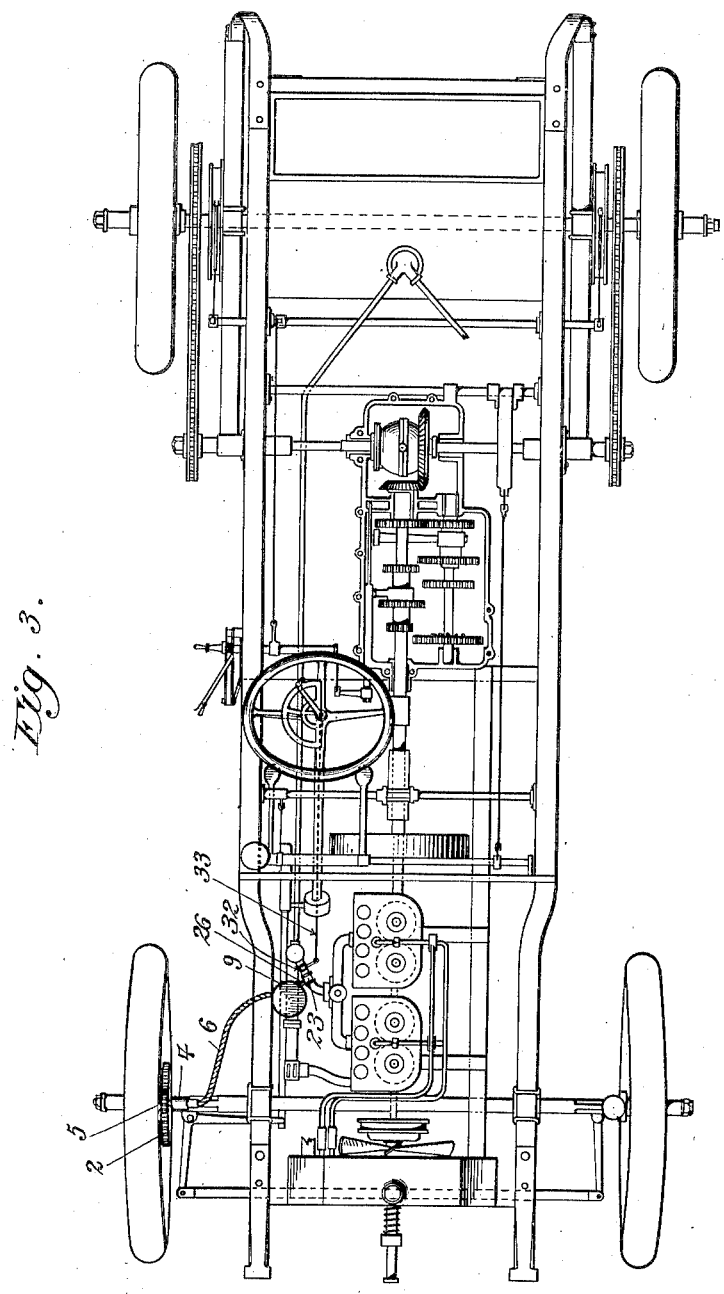

UNITED STATES PATENT OFFICE.

BENJAMIN F. LORD, JR., OF MILBURN, NEW JERSEY.

SPEED-CONTROLLER FOR MOTOR-VEHICLES.

1,009,675.

Specification of Letters Patent. Patented Nov. 21, 1911.

Application filed February 17, 1910. Serial No. 544,506.

*To all whom it may concern:*

Be it known that I, BENJAMIN F. LORD, Jr., a citizen of the United States, and resident of Milburn, county of Essex, and State of New Jersey, have made a new and useful Invention in Speed-Controllers for Motor-Vehicles, of which the following is a specification.

My invention has for its objects:—first, to provide novel means whereby the momentum of the running gear of a motor driven vehicle is made available through the agency of properly constructed mechanical appliances to automatically vary or limit the supply of force from which the driving power of the motor engine is derived, when a predetermined rate of speed is about to be exceeded; second, to provide an automatic controlling device of this nature which is at all times independent of and absolutely disconnected from the manual controlling means by which a chauffeur or driver manually effects the variation in speed of such motor driven vehicle; third, to provide means whereby the owner or properly authorized person may readily adjust or set the device so that it will be impossible for an unauthorized person using the vehicle to exceed any speed so set; fourth, to provide a speed controller for vehicles that shall be so constructed that when the set or predetermined speed of the motor driven vehicle is about to be exceeded the supply of force shall be practically instantaneously reduced to the limit allowed by the construction of the governor valve; fifth, to provide a form or arrangement of construction for the governor valve such that when said valve is closed it will not cut off the entire supply of force to the motor engine, but will allow of a sufficient supply of force passing to the motor engine to keep it in motion at a very low rate of speed; sixth, to provide a speed controller for motor driven vehicles which will in no way be influenced to act as a controller of the speed of a motor driven vehicle, unless the speed of said vehicle is about to exceed that for which the device is set to act; seventh, to wholly inclose the governing members of such a speed controlling mechanism in an inclosing case or box so constructed that it may be locked or sealed so as to prevent any unauthorized access to the inclosed mechanism; eighth, to provide means for effectually sealing all of the parts and connections of the automatic speed controlling mechanism of a motor driven vehicle so as to thereby prevent a chauffeur or any unauthorized person from removing or in any way tampering with or preventing the operation of such mechanism; ninth, to provide a speed controlling device which will not in any way impede or interfere with the full supply of force passing to the motor engine of a motor driven vehicle, except when the said vehicle is about to exceed a predetermined or set rate of speed.

Figure 2:
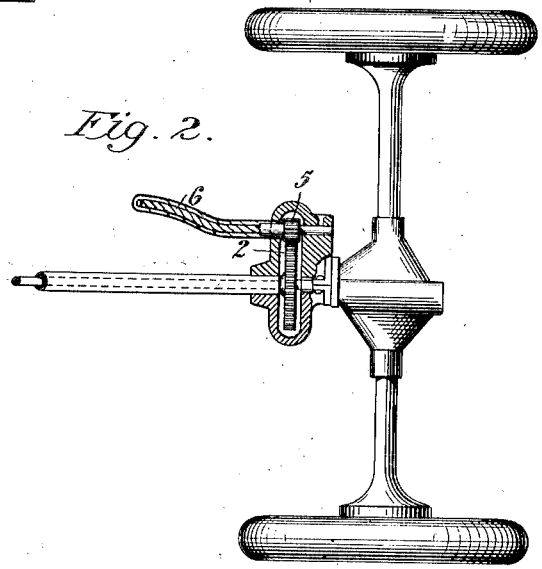

For a full and clear understanding of my invention, such as will enable others skilled in the art to construct and use the same, reference is had to the accompanying drawings, in which, Figure 1 is a front end elevational view of a part of the running gear of a motor driven vehicle, and a plan view of my speed controlling device illustrating the method of connecting the same with the running wheels of a motor driven vehicle; the view of the controlling device being shown on a much larger scale than that used for the part of the running gear shown, in order to give a clearer and more comprehensive idea of the mechanism involved. Fig. 2 is a plan view of the rear running wheels, axle, inclosed differential gear, and motor shaft of a motor driven vehicle, illustrating also a modified form of the means of transmitting motion from the rear running wheels to my novel speed control appliance. Fig. 3 is a plan view of the running gear of a vehicle showing a motor engine connected with the running wheels of said vehicle, a hand controlled connection with the throttle valve for the motor engine, and also the preferred location and manner of connecting my speed controlling device with the running wheels of the vehicle.

Referring now to the drawings in detail in all of which all reference numerals represent like parts wherever used, and first to Fig. 1, 1 represents the axle tree of a motor driven vehicle and 2 a gear-wheel secured directly to one of the front running wheels, the hub of which is supported upon a spindle carried by a sleeve 3 pivoted in turn to the axle tree 1 and provided with steering appliances (not shown) for guiding the vehicle but all constructed and operating in the usual manner. 4 represents a vertical standard secured by bolts directly to the sleeve 3 or some part of the steering gear in such a manner that the pinion 5 which is supported on the outer end of a short shaft, which is in turn supported by a journal bearing attached to the upper end of the standard 4, will mesh continuously with the gear-wheel 2. 6 is a flexible shaft permanently connected at one of its ends with the pinion 5, by means of the short journaled shaft and at the other end to a rigid sleeve 7 adjustably secured by a set-screw to the end of a shaft 8 journaled in turn in journal bearings in the bottom of an iron or like metal inclosing case or box 9. This flexible shaft is inclosed in a flexible covering secured at one end of its ends to the standard 4 and at the other to the case 9. 10 is a removable bottom secured by screws to the upper ends of standards which support all of the horizontal journal bearings and it is of sufficient thickness or strength to support the operative parts of the governing members 11, 12, 13, 14, 15, 16, 17, 18, said parts being above the removable bottom 10 of the inclosing case 9 and being directly or indirectly supported by it. The governor 11, as shown, is of the usual rotary ball type. 12 is a standard or sleeve, the upper end of which is connected to the balls of said governor in the usual way, and 13 is an arm secured to the sleeve 12 and in the drawing shown as being adapted to be moved to various heights on said sleeve, a scale being shown at the lower end of said sleeve 12 for indicating the various speeds as indicated by the position of the arm 13 on the sleeve 12 when it is desired that the vehicle shall not exceed any predetermined limit of speed. I prefer that the arm 13 shall be adjustable and secured to the sleeve 12 by a thumb set-screw, as shown, but it may be permanently attached to the sleeve 12 at any desired point and still embody a substantial part of my invention. 14, 15 are standards secured to the bottom 10 of the case 9 and adapted to act as pivotal supports for two levers 16 and 17 connected together by a short movable connection.

In order that the governor and the running wheel may be connected with the governor valve whenever the predetermined speed of the vehicle is reached there is inserted between the governor connection and the running wheel connection a movable link which I prefer to consist of the upright shaft 34 which is fitted at its opposite ends with pinions 20, 20, one of which, when the said link is raised by the governor, engages with the gear-wheel 21 connected with the shaft of a governor valve 23, while the other pinion 20 engages with a pinion 19 secured to a shaft 8 adapted to be operated by the running wheel which carries the gear-wheel 2. The weight of said movable link and two pinions 20, 20 is sufficient to keep the upper pinion 20 and gear-wheel 21 and lower pinion 20 and pinion 19 all normally out of mesh or unconnected. If preferred, a spring may also be used to aid in holding the pinions normally out of mesh, said spring being secured at its ends to the bottom 10 and lever 16 near the movable link.

18 is a pinion mounted on the shaft 8 or meshing with a similar pinion mounted on the lower end of the governor shaft and designed to cause the governor to revolve at a speed proportional to that of the running wheels of the vehicle.

21 is a gear-wheel having a gearing not exceeding 180° around its surface, said gear being supported by a shaft 22 journaled in the lower one of two necks or extensions 26—26 at one side of the box or case 9 and acting also as a support for a detachable section 25 in the main throttle pipe which supplies the gasolene or other force to the motor engine.

23 is a governor valve which is weighted on one of the sides or edges. It is secured to the outer end of the shaft 22 and rotatable in the section 25 of the throttle pipe and the arrangement is such that normally when the gear-wheel 21 is out of mesh with the upper pinion 20 the valve lies in the vertical plane of the throttle pipe and does not impede the passage of the force to the motor engine. If, however, the throttle pipe shall be other than a vertical pipe and the tendency of the weighted valve should be to move toward a closed position, the valve should be constructed without a weighted side; or a spring of sufficient strength could be attached to the valve stem in such a manner that the valve would always be in a wide open position, except when the action of the governing members of the controller so act upon it as to cause it to assume some other relative position in the throttle pipe.

24 is an opening through the valve designed to admit of the passage of a sufficient amount of force to prevent the motor engine from actually stopping when the governor valve is closed. It will also act as a means of preventing the suction of the motor engine from holding the valve closed when the gear-wheel 21 is out of mesh with the upper pinion 20.

27, 28 are connecting rings or ledges at the adjoining ends of the throttle pipe designed to effect a union or connection between said pipe and like connections on the ends of the section 25 through the agency of bolts, as shown, there being preferably two or more such bolts for each end connection.

29, 29, 29 are seals connected to said bolts in such manner as to make it impossible to remove the same without breaking said seals, a like seal 29 being connected with the bolt which connects the standard 4 to the sleeve 3 on the axle tree 1 of the vehicle.

These seals may be such as are ordinarily used in the sealing of the doors of freight cars, or any such well known seal as is found in the open market. Where the connections are of a relatively permanent nature they may be simple wires soldered at one end to each of the bolts and at the other ends to some adjacent part of the vehicle, so that the bolts cannot be released without breaking the wires, such matters being well within the skill of those versed in the sealing of appliances in order that they shall not be tampered with by unauthorized persons.

30 is the door to the inclosing casing or box 9 and 31 is a lock or other preferred means, such as a seal, for inclosing the casing in such manner that no one, other than the owner or other person authorized by him, may be enabled to have access to any part of the apparatus, the structural arrangement, as will be apparent, being such that when the door is closed and locked the vehicle will be automatically operative at such speed or speeds as it may be set for.

32 is a throttle valve for the engine, fitted to be operated by hand and it may be located at any point in the pipe or connection between the supply of force and the motor engine. 33 is the rod or connector running therefrom to the steering wheel or some other point, easy of access to the chauffeur or driver, the entire structural arrangement being such that automatic control is absolutely mechanically independent of and unconnected from the manual control.

The operation, it is thought, will be obvious, it being apparent that if it is desired that the vehicle shall not exceed a speed, say of ten miles an hour, the owner or other authorized person sets the adjustable arm 13 in such a position on the sleeve 12 as will indicate on the scale a speed of ten miles. The door 30 is then closed and locked or sealed, and should the vehicle, when in use, be about to exceed the limit as set, the motion transmitted through the gear-wheel 2 and its intermeshing pinions, flexible shaft 6, bevel gear 18, to the governor 11, will cause the same to lift the arm 13 into mechanical contact with the free end of the lever 17, thereby causing the lever 16 to lift the movable link on which the pinions 20—20 are mounted, thus compelling a connection between the governor 11 and the governor valve 23 through the upper pinion 20 and the gear-wheel 21 and the shaft 22, and also compelling a connection between the running wheels of the vehicle and the governor valve 23 by means of the motion transmitted through the gear-wheel 2 and its interconnecting pinions, flexible shaft 6 and connecting shaft 8, pinion 19, intermeshing with the lower pinion 20 through the movable link to the upper pinion 20, gear-wheel 21, shaft 22 to the governor valve 23, and by this connection the momentum of the running gear is made available to move the governor valve. When the predetermined speed is reached, it is obvious that the valve will close instantly, thus preventing any but a small amount of force to pass through the opening 24 sufficient to keep the engine running at a slow speed. It is also obvious that this result could not be accomplished if the closing of the governor valve was attempted by the direct lifting power of the governor. In that case, the governor valve would only begin to move toward a closed position when the vehicle reached a predetermined speed; consequently, it would be impossible to determine at what rate of relative speed the governor should begin to use its lifting power to move the governor valve toward a closed position, in order that at a predetermined vehicle speed the governor valve should occupy such a relative position (in regard to its wide open position in the throttle pipe) that it would permit a sufficient amount of force to pass to the motor engine to enable said engine to maintain a sufficient amount of power and relative rate of speed to drive the vehicle at the rate of speed that had been determined upon and at the same time prevent any speed of the vehicle in excess of that which had been determined upon; all adjustments having due regard to the constantly changing load on the motor engine. By load, I mean any condition that may arise which would require an increase or decrease in the amount of force required to maintain any given rate of vehicle speed. The pinions 18, 19 and lower pinion 20 and shaft 8 constituting all of the governing members below the removable bottom 10 are located in oil chambers supplied with sufficient oil to lubricate them thoroughly. The governing members 11, 12, 13, 14, 15, 16, 17 and upper 20, 21, 22, and 34 which are inclosed in the upper part of the box 9 are intended to be provided with bearings, whenever practical, that will reduce all friction of the moving parts to a minimum degree. They are, however, easily accessible to any authorized person through the door 30 of the case 9 for the purpose of oiling or adjusting. The flexible shaft 6 may be detached from the shaft 8 by withdrawing the set-screw through an opening in the removable bottom 10, a door being provided for closing such opening as shown. All the gear-wheels and shafting below the bottom 10 run preferably in oil so as to afford self lubrication.

It will be apparent that my novel speed controller is necessarily constant in its action, when set for any speed whatever, though the speed of the motor engine be increased, so that under no condition will the controller be caused to act to check or interfere with the force passing the governor valve to the motor engine, unless the vehicle is about to exceed the speed limit for which the controller is set. For example, it is a well known fact that in order that a motor driven vehicle may ascend a steep grade, it is often necessary to interpose a set of gears into the transmission train between the engine and the running wheels of the vehicle, thus gaining in power but losing in speed, provided that the same relative engine speed is maintained; but it is the usual practice among drivers of motor driven vehicles when running with a set of gears interposed in the transmission train to speed up the engine until its increased relative speed will cause the vehicle to travel at the same speed as that at which it was traveling before the gears were changed or interposed. In many cases even a greater vehicle speed is desired in order that the momentum acquired may assist the vehicle in climbing the steepest part of a grade. In order to secure the increased speed of the engine it is obvious that a greater amount of force must be allowed to pass to the motor engine; it is also obvious that if the governor valve is directly connected to the governor, or is dependent on the lifting power of the governor itself to move it toward a closed position, the governor valve will always be in the same relative position in the throttle pipe at any given vehicle speed, and this without regard to the critical point in the action of the governor in overcoming the resistance of the governor spring, provided always that the tension on the spring remains the same. Consequently, as the governor begins to move the governor valve toward a closed position, and the valve in its travel reaches the point at which the force passing the valve to the motor engine and thus by means of the governing mechanism, acting to move said valve toward a closed position, is opposed and balanced by the force exerted by the weight of the governor balls and connection and the power of the governor spring all acting to move the valve toward a wide open position, a state of mechanical equilibrium will then be set up and the valve will always be in or occupy the same relative position in the throttle pipe, if the conditions which exist at this time remain the same. If, however, the conditions vary in the slightest degree the point of equilibrium will also vary; consequently, as it is a well known fact that the conditions under which a motor driven vehicle is used are constantly varying, I believe that it will be quite plain that a continuously connected governor and governor valve on a motor driven vehicle cannot be so adjusted as to allow a free and unimpeded passage of the supply of force to the motor engine at all times, other than that at which the vehicle is about to exceed a predetermined rate of speed.

I am well aware that a number of inventors have sought and obtained patents on various devices by which they intended to control the speed of a motor driven vehicle, but they have all confined themselves to a mechanism having a governor and a governor valve directly and continuously connected.

I make the above explanation in order that there may be no confusion in the minds of others as to the difference in results obtained by those devices already patented, and my device for which I am seeking a patent.

In Fig. 2 of the drawings I have illustrated how motion may be transmitted from the rear running wheels of a motor driven vehicle to the flexible shaft 6 through the agency of a gear-wheel and associated pinion, both inclosed in a surrounding casing inaccessible to unauthorized persons and adapted to hold sufficient oil to lubricate all of the parts.

In Fig. 3 of the drawings I have illustrated the running gear of a motor vehicle showing a motor engine connected in one of a number of usual ways to the running wheels of said vehicle. A hand control for the usual throttle valve mechanism of well known form is shown and the preferred location of the case 9 inclosing the governing members of my novel speed controlling device. The device may, if preferred, be located at some other more convenient place in the line of communication between the source of supply of force and the motor engine and still embody substantially the parts of my invention.

Obviously many of the details of my novel speed controller may be departed from and still embody substantial parts of my device, the most generic feature of my invention being directed to the application of a speed controller to a motor driven vehicle in such manner that the momentum of the vehicle itself is automatically made available to cut off or limit the supply of force by means of which the vehicle is driven, when a predetermined speed is reached, and through the agency of mechanism protected from interference by and not under the control of unauthorized persons, thus enable an owner or duly constituted authorities to regulate the rate of speed for motor driven vehicles above which speed the said vehicles shall not be allowed to travel by reason of my device, but it shall at all times and under all conditions be possible to operate said motor driven vehicles in the same manner and by the same means as if the said vehicles were not provided with an automatic controlling device, provided that the speed of the vehicle shall not be in excess of that determined upon as its maximum rate of speed, and this without relation to any specific type of applied force, my invention being generically applicable to any motor driven vehicle no matter what the source of driving force may be.

I do not limit myself to any specific form or shape of box or case by which the governing members are surrounded, as obviously the case might be of any form or shape and still accomplish the result which I wish to accomplish; namely, preventing unauthorized access to the governing mechanism. Nor do I limit myself to the use of a ball governor in effecting a connection between the running wheels of a motor driven vehicle and the governor valve, as obviously there are many forms of governors that might be adapted so as to be used in my device in place of the ball governor shown, and still embody substantial parts of my invention.

Having thus described my invention what I claim and desire to secure by Letters Patent of the United States is—

1. The combination with the running gear of a vehicle, and a motor engine connected with said running gear, of a governor continuously connected with said running gear, a throttle valve for the engine adapted to be manually operated, a governor valve operating upon the supply of fluid to the motor engine and which governor valve in its normal condition is open and unconnected with the running gear, and means operated by the governor to compel a connection between the running gear and the governor valve and instantaneously close the governor valve whenever the speed of the vehicle reaches a predetermined limit, substantially as described.

2. The combination with the running gear of a vehicle, and a motor engine connected to said running gear, of a governor continuously connected with said running gear, a throttle valve for the engine adapted to be manually operated, a governor valve operating upon the supply of fluid to the motor engine and which in its normal condition is open and unconnected with the running gear, means operated by the governor to compel a connection between the running gear and the governor valve whenever the speed of the vehicle reaches a predetermined limit, thereby instantaneously closing said governor valve and holding it closed until the speed of the vehicle falls below said limit, and mechanism for adjusting said means so as to vary the limit at which a connection is compelled between the running gear and the governor valve, substantially as described.

3. The combination with the running gear of a vehicle, and a motor engine connected with said gear, of a governor continuously connected with said gear, a throttle valve for the engine adapted to be manually operated, a governor valve for the engine normally open and unconnected with the running gear, means operated by the governor to compel a connection between the governor valve and the running gear whenever the speed of the vehicle reaches a predetermined limit, said means being so constructed as to instantaneously close the said governor valve and hold it closed until the speed of the vehicle falls below said limit and then to release said governor valve, and a weight operating to open said governor valve when released, substantially as described.

4. The combination with the running gear of a vehicle and a motor engine connected to said gear, and a governor continuously connected to said running gear, a throttle valve for the engine adapted to be manually operated, a governor valve for said engine normally open and unconnected with the running gear, said governor valve being perforated to allow a small supply of motor fluid to pass to the engine in order that the engine may not be entirely stopped when the governor valve is brought into action, and means operated by the governor to compel a connection between the running gear and the governor valve whenever the speed of the vehicle reaches a predetermined limit, and thereby instantaneously close said governor valve, substantially as described.

5. The combination with the running gear of a vehicle and a motor engine connected thereto, of a governor continuously connected with said gear, a throttle valve for the engine adapted to be manually operated, a governor valve for said motor engine normally open and unconnected with the running gear, means operated by the governor to compel a connection between the running gear and the governor valve whenever the speed of the vehicle reaches a predetermined limit, thereby instantaneously closing said governor valve, said means including shiftable gearing between said running gear and said governor valve, a lever and connections adapted to move said shiftable gearing, and an arm adjustably secured to a part of said governor to operate said lever, substantially as described.

6. The combination of the running gear of a vehicle, the motor engine connected with the said gear, a governor continuously connected with the said gear, a throttle valve for the engine fitted to be manually operated, a governor valve operating upon the supply of force to the motor engine and which in its normal condition is open and unconnected with the governor, a device operated by the governor to compel a connection between the governor and the governor valve, whenever the speed of the vehicle reaches a predetermined limit, and a movable link controlled by the governor in the connection between the governor valve and the running gear, whereby the momentum of the running gear is made available to instantaneously close the governor valve when the predetermined speed is reached, substantially as described.

7. The combination of the running gear of a vehicle, the motor engine connected with the said gear, a governor continuously connected with the said gear, a throttle valve for the engine fitted to be manually operated, a governor valve operating upon the supply of force to the motor engine and which in its normal condition is open and unconnected with the governor, a device operated by the governor to compel a connection between the governor and the governor valve whenever the speed of the vehicle reaches a predetermined limit, a movable link controlled by the governor in the connection between the governor valve and said gear, whereby the momentum of the running gear is made available to instantaneously close the governor valve when the predetermined speed is reached, and adjustable means whereby the determined speed at which the governor acts to control said movable link may be varied, substantially as described.

8. The combination of the running gear of a vehicle, the motor engine connected with said gear, a governor continuously connected with said gear, a throttle valve for the engine fitted to be manually operated, a governor valve operating upon the supply of force to the motor engine and which in its normal condition is open and unconnected with the governor, a device operated by the governor to compel a connection between the governor and the governor valve whenever the speed of the vehicle reaches a predetermined limit, a movable link controlled by the governor in the connection between the governor valve and the running gear, whereby the momentum of the running gear is made available to instantaneously close the governor valve when the predetermined speed is reached, the said governor valve being constructed as to only partially cut off the supply of force to the motor engine, substantially as described.

In testimony whereof I have signed my name to this specification in the presence of two subscribing witnesses.

BENJAMIN F. LORD, Jr.

Witnesses:
   Wm. T. Callaway,
   Robert Dausend.